(12) United States Patent
Kouchiyama et al.

(10) Patent No.: US 7,587,194 B2
(45) Date of Patent: Sep. 8, 2009

(54) MOBILE STATION HAVING WAITING PROCESS WITH MAIN POWER OFF

(75) Inventors: Satoshi Kouchiyama, Chita (JP); Teruhiko Karashima, Kariya (JP)

(73) Assignee: Denso Corporation, Kariya (JP)

( * ) Notice: Subject to any disclaimer, the term of this patent is extended or adjusted under 35 U.S.C. 154(b) by 51 days.

(21) Appl. No.: 11/386,895

(22) Filed: Mar. 23, 2006

(65) Prior Publication Data
US 2006/0197654 A1    Sep. 7, 2006

Related U.S. Application Data

(63) Continuation of application No. 10/245,494, filed on Sep. 18, 2002, now Pat. No. 7,046,981.

(30) Foreign Application Priority Data

| Sep. 20, 2001 | (JP) | ............................. 2001-287310 |
| Sep. 20, 2001 | (JP) | ............................. 2001-287315 |
| Jul. 8, 2002 | (JP) | ............................. 2002-198883 |

(51) Int. Cl.
  *H04B 1/16* (2006.01)
(52) U.S. Cl. .................. 455/343.1; 455/522; 455/574; 455/343.2
(58) Field of Classification Search .............. 340/439, 340/539.18; 455/522, 343, 574
  See application file for complete search history.

(56) References Cited

U.S. PATENT DOCUMENTS

| 5,504,684 | A | 4/1996 | Lau et al. |
| 6,195,597 | B1 | 2/2001 | Yamada |
| 7,046,981 | B2 * | 5/2006 | Kouchiyama et al. .... 455/343.1 |
| 2001/0037168 | A1 * | 11/2001 | Hozuka et al. ................ 701/29 |
| 2004/0160319 | A1 | 8/2004 | Joao |
| 2005/0083230 | A1 * | 4/2005 | Harvey et al. .......... 342/357.06 |

FOREIGN PATENT DOCUMENTS

| JP | A-60-070833 | 4/1985 |
| JP | A-08-227328 | 9/1996 |
| JP | A-11-305878 | 11/1999 |
| JP | A-2001-100867 | 4/2001 |
| JP | A-2002-009688 | 1/2002 |

* cited by examiner

*Primary Examiner*—Nay A Maung
*Assistant Examiner*—Richard Chan
(74) *Attorney, Agent, or Firm*—Oliff & Berridge, PLC

(57) ABSTRACT

While main power in an automobile is off, a telematics station in the automobile intermittently runs to execute a process. The station has a first CPU in a wireless section for a wireless signal waiting process and a second CPU, having active and sleep modes, in a control section for resetting the first CPU. At resetting timing, if the first CPU is executing the process, it outputs a signal indicating that it is executing the process for the second CPU not to reset it. When the main power turns on, the second CPU determines that the signal is not outputted in order to reset the first CPU.

2 Claims, 4 Drawing Sheets

 …

MOBILE STATION HAVING WAITING PROCESS WITH MAIN POWER OFF

This is a Continuation of application Ser. No. 10/245,494 filed Sep. 18, 2002. The entire disclosure of the prior application is hereby incorporated by reference in its entirety.

CROSS REFERENCE TO RELATED APPLICATION

This application is based on and incorporates herein by reference Japanese Patent Application Nos. 2001-287310 filed on Sep. 20, 2001, 2001-287315 filed on Sep. 20, 2001, and 2002-198883 filed on Jul. 8, 2002.

FIELD OF THE INVENTION

The present invention relates to a mobile station such as a telematics station in an automobile having a wireless signal waiting process while main power in the automobile is off. It is suitable for telematics applications that connect inside and outside of the automobile.

BACKGROUND OF THE INVENTION

Some mobile stations provided in moving objects, for instance in telematics, are required to run and remain in a wireless signal waiting process even while main power of the moving bodies is off. Here, the telematics provides various services by the comprehensive utilization of global positioning system (GPS), the Internet, the mobile station and others. For instance, when an automobile or a ship is stolen, a server station determines the location of the stolen automobile or ship through a procedure of sending a command to the stolen automobile or ship that should obtain its own location information by using the GPS to return it to the server station.

When it is difficult for a car owner to find out his own car in premises such as a large parking lot, the owner can easily know the car location through a procedure of calling the server station and having the server station send to the car a command that the car should honk a horn or blink a headlight on and off.

When an airbag is expanded in a car, a telematics station in the car that has detected the expansion automatically sends out its location information along with the information regarding the airbag expansion to the server station. The service station contacts the driver in the car, following which the server station informs the police or an insurance company if emergency such as a traffic accident occurs. Thus, a prompt action can be possible to a trouble such as the accident.

The other services such as remote door lock/unlock, car stereo and hands-free phone cooperative system, and e-mail service have been proposed.

In order to realize the above telematics services, even if the main power of the moving object is off, the mobile station in the moving object must continue to run and remain in a wireless signal waiting process to be ready for receiving a command by a remote access, obtaining present location information, and transmitting a message.

The telematics station, in general, has a CPU for the wireless signal waiting process or the receiving process. In the case, it is conceivable that the CPU intermittently executes the wireless signal waiting process to save power consumption. The above CPU is reset, typically for securing reliable operation, at timing when main power turns on. If the CPU is reset when the CPU is executing the wireless signal waiting process or the receiving process, the process must be interrupted.

Moreover, for instance in the automobile, when an engine starts along with the main power turning on, battery voltage rapidly fluctuates and the reset may not be always successful. Furthermore, quick repeating of the main power ON/OFF may result in failure of reset procedure. FIG. 6 shows relation between wireless power voltage in a telematics station and a reset signal (S-rst) in a case that main power ON occurs shortly after main power OFF. Here, the reset signal is generated by detecting power ON. When a period from OFF to ON of the main power becomes too short, the voltage just before ON insufficiently reduces. Accordingly, the main power ON is not properly detected to result in failure of generating the reset signal.

SUMMARY OF THE INVENTION

A first object of the present invention is to provide a mobile station capable of continuing to execute the process such as a wireless signal waiting process or a receiving process without interruption. A second object of the present invention is to provide a mobile station capable of reliably resetting a CPU while main power of a moving object turns on.

To achieve above objects, a mobile station, which intermittently runs to execute the wireless signal waiting process even when the main power of the moving object turns off, has a first CPU for the wireless signal waiting process and a reset method for resetting the first CPU. Here, the reset method does not reset the first CPU when the first CPU is executing the wireless signal waiting process.

Moreover, the above reset method is replaced with a second CPU communicating with the above first CPU. The first CPU outputs to the second CPU a signal indicating that it is executing the wireless signal waiting process. When the main power turns on, the second CPU resets the first CPU after determining that the signal is not outputted. Here, the reset is executed through communication between two CPUs, so that failure of the reset is prevented when the main power turns on.

Furthermore, to save the power consumption of the mobile station, the second CPU has sleep and active modes. While the main power is off, the second CPU does not shift from the sleep mode to the active mode until it receives, from the first CPU, a signal indicating that the first CPU has detected wireless reception.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
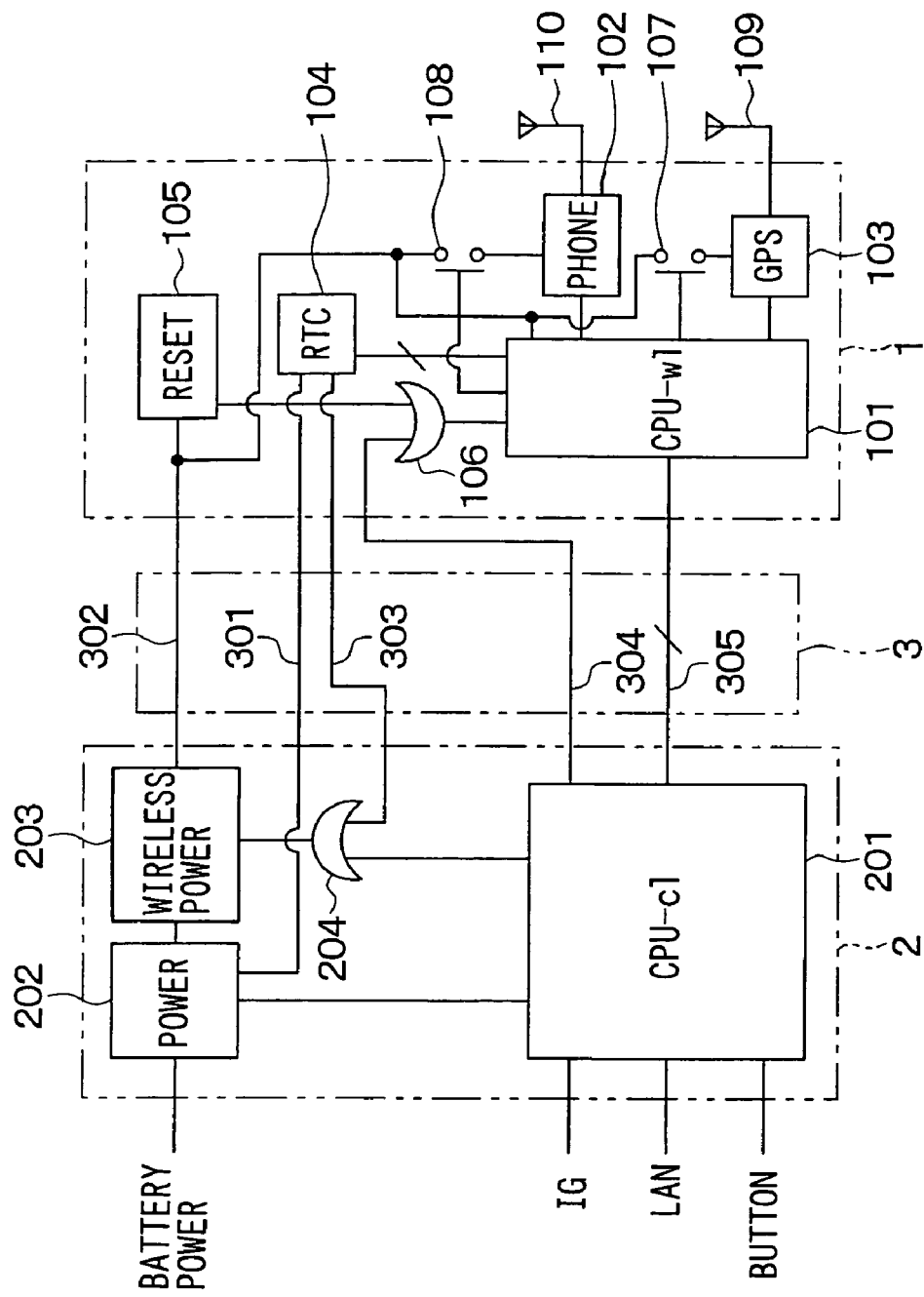
FIG. 1 is a block diagram illustrating a structure of a telematics station according to an embodiment of the present invention.

Referring to FIG. 1, a telematics station includes a wireless section 1 and a control section 2.

The wireless section 1 includes a CPU as the first CPU (CPU-wl) 101 which executes a wireless signal waiting process, a receiving process, and a wireless communicating process, a phone module 102, a global positioning system (GPS) receiver 103, a real time clock (RTC) 104, a power-on reset circuit 105, an OR gate 106, a GPS receiver switch 107, and a phone module switch 108.

The CPU-wl 101 sends the phone module 102 a transmission signal for an antenna 110 to transmit a wireless signal, and receives a reception signal through the phone module 102 from the antenna 110. Also the CPU-wl 101 obtains location information from the GPS receiver 103 connected with an antenna 109. Moreover, the CPU-wl 101 controls ON/OFF of the GPS receiver switch 107 used for a power supply to the GPS receiver 103 and the phone module switch 108 used for power supply to the phone module 102.

The RTC 104 possesses a timing counter (not shown) and shifts a power request signal (S-prq) to ON (alarm outset), as described later, when the timing counter is incremented to preset time. The RTC 104 shifts the S-prq to OFF (alarm set) when the timing counter is reset by the CPU-wl 101. Here, the ON of S-prq means that voltage is at high level while the OFF mode of S-prq means that voltage is at low level.

The power-on reset circuit 105 outputs a reset signal (S-rst) to the CPU-wl 101 for power-on reset when power is supplied.

The control section 2 includes a CPU as the second CPU (CPU-cl) 201 for a reset method, a power circuit 202, a wireless power circuit 203, and an OR gate 204. The control section 2 also includes an echo canceller (not shown) which outputs voice to an external voice output device (not shown) by the control of the CPU-cl 201. The CPU-cl 201 receives power from the power circuit 202 and controls the wireless power circuit 203 through the OR gate 204. The power circuit 202 receives power from an external battery power source.

The CPU-cl 201 possesses interfaces with in-vehicle local area network (LAN) and with user input devices such as a manipulation button, and an input line through which ON/OFF of an ignition (IG) switch is detected.

The CPU-cl 201 communicates with automobile components of doors, a horn, lamps, airbags, an air conditioner, an audio unit, and others through the in-vehicle LAN. For instance, the CPU-cl 201, through the in-vehicle LAN, detects components' situations such as airbag's expansion and controls components' behavior such as door's switching.

A connecter 3 connects the wireless section 1 and the control section 2. Through the connector 3, a power supply line 301 from the power circuit 202, a power supply line 302 from the wireless power circuit 203, a S-prq line 303, a reset control line 304, and a serial communication line 305 carry signals between the wireless section 1 and the control section 2.

The RTC 104 in the wireless section 1 is continuously supplied with power through the power supply line 301. The CPU-wl 101 and the power-on reset circuit 105 are supplied with power through the power supply line 302.

When the IG is OFF, the CPU-cl 201 remains in a sleep mode until it receives an external wake-up signal. In the sleep mode of the CPU-cl 201, the CPU-wl 101 behaves as described later. When the IG is OFF, the RTC 104 constantly receiving the power supply sends out the S-prq as ON through the S-prq line 303 to the wireless power circuit 203 as the timing counter expires every fifteen minutes.

As the wireless power circuit 203 detects the S-prq as ON, it supplies, with an internal switch ON, the wireless section 1 with the power through the power supply line 302. Thus the power-on reset circuit 105 starts to send out a S-rst through the OR gate 106 to the CPU-wl 101.

The CPU-wl 101 starts by the power supply through the power supply line 302 from the wireless power circuit 203 to reset by receiving the S-rst through the OR gate 106 from the power-on reset circuit 105. The CPU-wl 101 that has been reset immediately controls the phone module switch 108 to have the phone module 102 supplied with the power.

Figure 2:
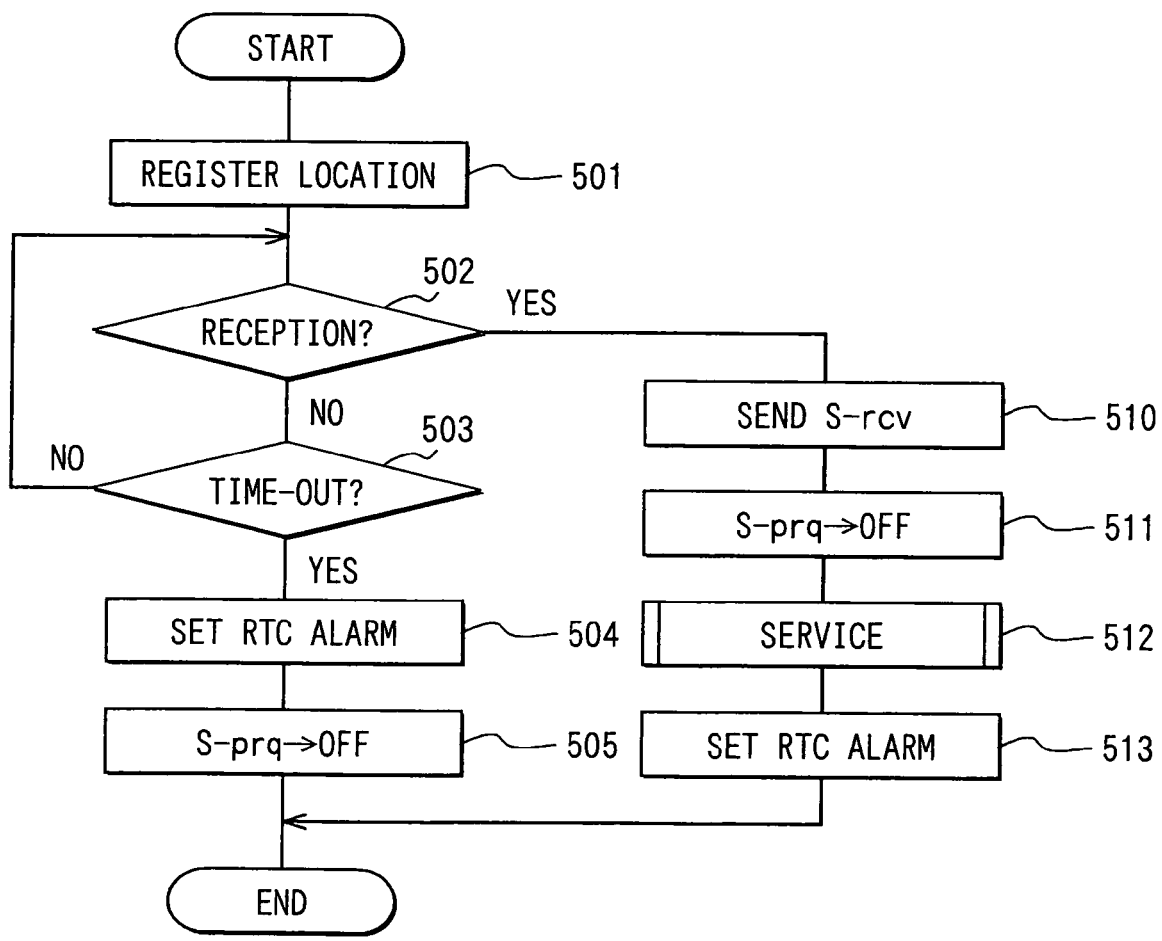
FIG. 2 is a flow diagram illustrating a procedure of a first CPU in a wireless section (CPU-wl) with an ignition switch OFF according to the embodiment.

Referring to FIG. 2, a procedure of the CPU-wl 101 following the start is explained.

At first, the CPU-wl 101 is reset following the start to execute a wireless signal waiting process. At step 501, it sends out a wireless signal to a neighboring base station through the phone module 102 (location registration), following which at step 502 it determines whether it has received an incoming call. At step 502, the receiving process is executed instead of the wireless signal waiting process. Here, presence of reception may be determined in presence of a plurality of incoming calls. For instance, the CPU-wl 101 determines the presence of reception by detecting two time incoming calls a series of call—cut off—call within a minute, so that it becomes easier to recognize whether the call should be from a telematics server station or from the others.

As the other instance, the presence of reception may be determined by receiving a caller ID in the incoming call or a predetermined message of a short message such as an e-mail, which also enables to recognize whether the call should be from the telematics server station or from a base station. Here, when received data are specific to a telephone network such as exchanged control information and are determined not to require the control section 2 to execute them by observing the contents of the received caller ID or the short message, the CPU-wl 101 does not send out a receiving signal (S-rcv) to the CPU-cl 201 even though it has received the data (not shown in FIG. 2). Accordingly, the CPU-cl 201 remains in the sleep mode though the CPU-wl 101 is executing the wireless communicating process.

When absence of the reception is determined, the procedure proceeds to step 503 to determine time-out which indicates that it has passed a predetermined period from the time when the location registration is done. Here, when the procedure proceeds to step 503 from step 502, the wireless signal waiting process is substituted for the receiving process at step 502. The predetermined period to determine the time-out is set to, for instance, 30 seconds. Here, when the time-out is not determined, the procedure returns to step 502 to repeat steps 502 and 503 until the time-out is determined or the presence of the reception is determined. Contrary, when the time-out is determined, the procedure proceeds to step 504.

At step 504, an alarm of the RTC 104 is set, and then at step 505 the S-prq from the RTC 104 is set to OFF and the wireless signal waiting process ends. Hereby, with the stop of the power supply from the wireless power supply circuit 203, the CPU-wl 101 and the phone module 102 stop their operations. The above series of the steps are resumed by an outset of the alarm of the RTC 104 and are repeated periodically or intermittently as long as the IG remains in OFF. In the above case, the CPU-wl 101 is executing the wireless signal waiting process, the receiving process, and the wireless communicating process which is executed only by the CPU-wl 101 without the CPU-cl 201 which remains in the sleep mode. Here, the CPU-wl 101 continues to have a clear-to-send (CTS) signal of a serial communication line 305 set to HIGH. Also, the CPU-wl 101 outputs data indicating that each communication is processing through a data line of the serial communication line 305. Pairs of the CTS signal and each data indicate signals of the wireless signal waiting process, the receiving process, and the wireless communicating process.

When the presence of the reception is determined at step 502, the procedure proceeds to step 510 and the CPU-wl 101 sends out a S-rcv through the serial communication line 305 to the CPU-cl 201. Here, the S-rcv is different from a receiving-process signal. The CPU-cl 201 shifts to an active mode from the sleep mode by detecting the S-rcv and sends out the CPU-wl 101 a command that the S-prq should be set to OFF through the serial communication line 305 in order to control the wireless power circuit 203 by itself. At step 511, the CPU-wl 101 that has received the command controls the RTC 104 to shift the S-prq to OFF, following which the CPU-wl 101 executes step 512 called a service process. The receiving process thus ends. In addition, the service process includes executing communication after the reception of the incoming call, so that the service process includes the wireless communicating process.

The service process is executed by collaboration between the wireless section 1 and the control section 2 to realize various kinds of telematics applications as described above. An instance that starts the service process through the reception of the incoming call is a procedure for a stolen car. The car owner who has recognized that the car is stolen notifies a service agency of the fact, following which the service agency sends out to the stolen car a signal from a server of the service agency. If the signal is, for instance, that it requires present location information of the car, the wireless section 101 of the telematics station of the stolen car that has received the signal enters the service process through steps 510 and 511 as described above. Here, the CPU-wl 101 has the GPS receiver switch 107 set ON to obtain the location information through the GPS receiver 103. Then it returns the obtained location information to the server through the phone module 102, which procedure reveals the present location of the stolen car.

When it is difficult for a car owner to find out his own car in premises such as a large parking lot which is still narrower than the above instance, the owner may choose the following service. As soon as he contacts a server station by a cell phone or others to carry out a predetermined procedure, the server station sends out the command signal that has the car honk a horn or blink a headlight on and off. The wireless section 1 of the car's telematics station that has received the command signal conveys the command to the control section 2. The control section 2 controls the horn or the headlight through the in-vehicle LAN. Thus, people including the owner in the vicinity of the car is enabled to detect the car location.

In addition, when car doors are locked with a door key inside or it is impossible for lock/unlock of the doors to be operated in a normal manner, the car owner may choose the following service. As soon as he contacts the server station by a cell phone or others, the server station sends out the command signal that instruct unlock or lock of the doors. The car's telematics station controls the lock/unlock of the doors through the in-vehicle LAN.

Incidentally, in the above service processes, if the location information is additionally needed, the CPU-wl 101 has the GPS receiver switch 107 ON to obtain the location information through the GPS receiver 103.

When the service process is completed, the CPU-wl 101 resets the counter of the RTC 104 at step 513. Then, the CPU-cl 201 shifts the S-pcl to OFF, so that the CPU-wl 101 stops along with the phone module 102. The foregoing is the major procedure of the CPU-wl 101 while IG is OFF.

As explained above, the period that the CPU-wl 101 is detecting the reception of the incoming call at step 502 and also the period from determining the reception at step 502 to entering the service process at 512 are defined as staying in the receiving process. While the CPU-wl 101 is detecting the reception, it sends out the receiving-process signal to the CPU-cl 201 through the serial communication line 305 along with outputting a reception ring to the CPU-cl 201 through a voice signal line (not shown).

As long as the CPU-cl 201 is in the active mode regardless of ON/OFF of the IG, the CPU-wl 101 stays in the wireless signal waiting process until it shifts to other processes such as the receiving process, the wireless communicating process and the service process.

The procedure of the CPU-cl 201 in the active mode is explained as follows. The CPU-cl 201 enters the active mode through a plurality of triggers. The first trigger is receiving the S-rcv from the CPU-wl 101 as described above. The other is receiving an IG ON or an external input signal from the in-vehicle LAN, user interfaces and others. An instance of the input from the in-vehicle LAN is that the in-vehicle LAN automatically detects and notifies the telematics station inside the car when the forced power is applied to the car body or the door window is broken. Here, the telematics station sends out an alarm message to the server station according to the notification from the in-vehicle LAN, following which the server station takes action such as informing the car owner or the police of the fact.

Figure 3:
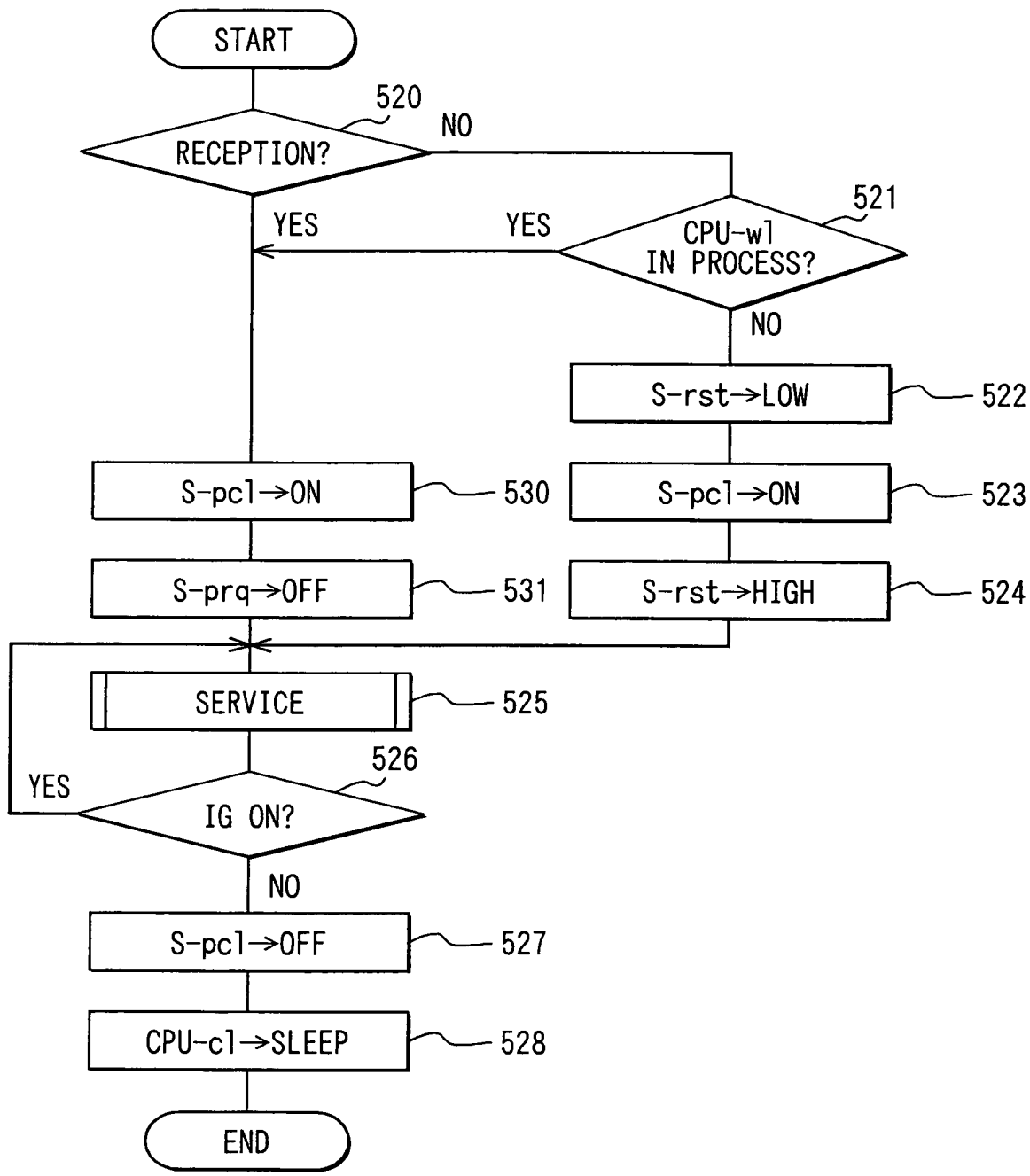
FIG. 3 is a flow diagram illustrating a procedure of a second CPU in a control section (CPU-cl) in an active mode according to the embodiment.

Referring to a flow diagram in FIG. 3, the procedure of the CPU-cl 201 in the active mode is explained. The procedure is divided into two kinds depending on the cases that the mode is changed by receiving the S-rcv or not.

As the CPU-cl 201 shifts to the active mode, the next procedure is that the CPU-wl 101 should be reset. Here, at step 520, whether the shift is done by receiving the S-rcv is determined. When the shift is determined to be by receiving the S-rcv, the procedure proceeds to step 530. The S-pcl from the CPU-cl 201 is shifted to ON and sent to the wireless power circuit 203 through the OR gate 204. Here, ON of the S-pcl means the voltage of the signal is at high level and OFF of the S-pcl means the voltage of the signal is at low level.

Figure 4:
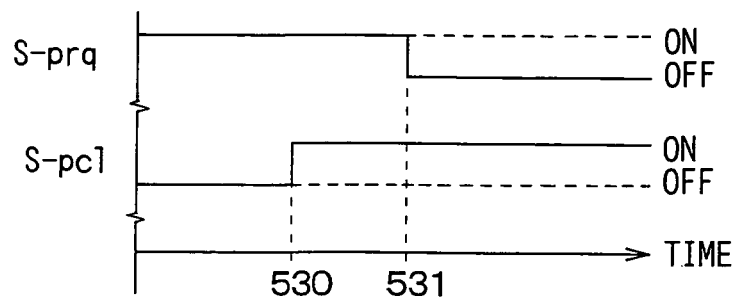
FIG. 4 is a diagram illustrating ON/OFF timing of a power request signal (S-prq) and a power control signal (S-pcl) in steps 530 and 531 shown in FIG. 3.

Next at step 531, the CPU-cl 201 sends out the command that the S-prq from the RTC 104 should be set to OFF through the serial communication line 305. FIG. 4 shows timing of the S-prq ON→OFF and the S-pcl OFF→ON in the procedure at steps 530 and 531. The control role of the wireless power circuit 203 is transferred from the RTC 104 to the CPU-cl 201 through the above procedure. However, as shown in FIG. 4, since the S-pcl ON or the S-prq ON from at least either of the CPU-cl 201 or the RTC 104 is being sent between step 530 and step 531, the wireless power circuit remains ON by a function of the OR gate 204. Therefore the power-on reset circuit 105 does not send out the S-rst, so that the CPU-wl 101 is never reset.

When the shift is determined to be not by receiving the S-rcv at step 520, namely, the shift is by receiving an IG ON or an external input signal from the in-vehicle LAN, user interfaces and the others, the procedure proceeds to step 521. At step 521, whether the CPU-wl 101 is at least in any process of the wireless signal waiting, the reception or the wireless communicating is determined by the CTS signal from the CPU-wl 101. If the determination is YES, the procedure proceeds to step 530 and the control role of the wireless power circuit 203 is transferred from the RTC 104 to the CPU-cl 201 without the CPU-wl 102 being reset, as described above, at steps 530 and 531. Here, the above case is, for instance, that the CPU-wl 101 is executing any of the steps 501~503 when the CPU-cl 201 shifts to active mode due to the IG ON.

In addition, as the CPU-cl 201 shifts to the active mode during the receiving process, the CPU-cl 201 receives, from the CPU-wl 101, the S-rcv and the reception ring signal through the voice signal line (not shown) and outputs the reception ring to an external voice output device by controlling an echo canceller. Thus, the user of the telematics station recognizes it and is enabled to manually receive the call from the outside.

Figure 5:
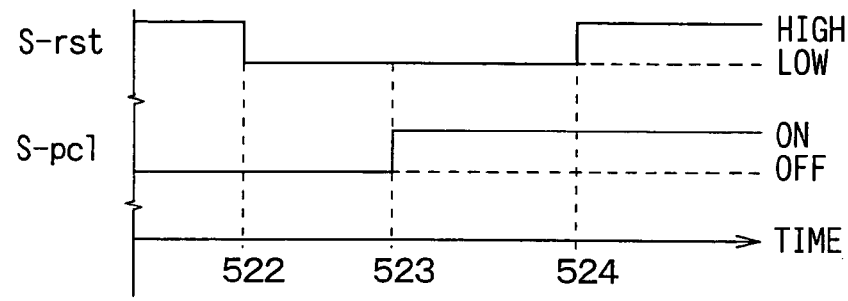
FIG. 5 is a diagram illustrating timing of a reset signal (S-rst) and a power control signal (S-pcl) in steps 522~524 shown in FIG. 3.
Figure 6:
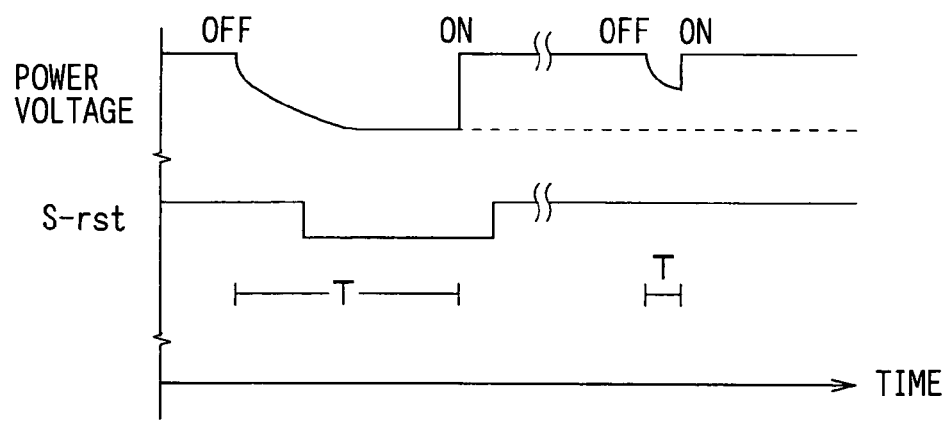
FIG. 6 is a diagram illustrating time-series behavior of wireless power voltage with the ignition switch ON/OFF.

At step 521, when the determination is NO, the procedure proceeds to step 522. At step 522, the CPU-cl 201 sets the S-rst to LOW (S-rst assert) to send out to the CPU-wl 101 through the reset control line 304 and the OR gate 106. Then, at step 523, the CPU-cl 201 sets the S-pcl to ON to send out to the wireless power circuit 203 through the OR gate 204. Thus, the wireless power circuit 203 turns on and the CPU-wl 101 starts. Here, the S-rst from the reset line 304 is at low level. Accordingly, the CPU-wl 101 executes the reset procedure and controls the phone module switch 108 to have the phone module 102 supplied with the power. Continuously, the procedure proceeds to step 524 and the CPU-cl 201 sets the S-rst to HIGH (S-rst negate) after the interval of a predetermined period. FIG. 5 shows timing of the S-rst and the S-pcl in the procedure at steps 522~524. When step 524 or step 531 is completed, the procedure proceeds to step 525 to start the service process.

Though the service process is explained above, instances of the service processes during the IG ON are an airbag expansion automatic alert, car stereo and hands-free phone cooperative system, e-mail service and others.

In the airbag expansion automatic alert, when the airbag is expanded in a car, the fact is reported to the telematics station through the in-vehicle LAN. The telematics station that has been reported obtains location information through the GPS receiver 103 to send it out to the service station along with the information regarding the airbag expansion through the phone module 102. The service station contacts the driver in the car through telephone, following which it informs the police and an insurance company or calls an ambulance if the driver does not reply or the driver tells emergency such as an accident occurs.

In the car stereo and hands-free phone cooperative system, when the driver calls without holding the telephone, he can hear the receiving voice through the car stereo speaker. Here, when the phone module 102 of the telematics station is used for call, the control section 2 controls the car stereo through the in-vehicle LAN to output the voice from the car stereo speaker.

In the e-mail service, the phone module 102 connects with an Internet provider by manipulating a button of the telematics station or a computer connected to the in-vehicle LAN, so that the e-mail is received or transmitted. Here, the telematics station may have its own display to show the received e-mail or may convert the e-mail from text to voice to have the car stereo speaker read it through the in-vehicle LAN. In addition, the transmission message may be input through the manipulation button or data stored in the computer may be directly sent through the in-vehicle LAN.

After the service process is completed, the procedure proceeds to step 526 and whether the IG is ON/OFF is determined. If the IG is ON, the procedure returns to step 525. If the IG is OFF, the procedure proceeds to step 527 and the CPU-cl 201 sets the S-pcl, which has been sent to the wireless power circuit 203 through the RTC 104, to OFF to stop the power supply to the CPU-wl 101 and the others. Then, the procedure proceeds to step 528 and the CPU-cl 201 shits itself to the sleep mode and completes the process.

In the above procedure, with the IG OFF, the CPU-wl 101 starts at an interval of 15 minutes except for a specific command being generated and the CPU-cl 201 returns to the sleep mode, so that power consumption can be reduced.

Moreover, since the CPU-cl 201 sends out the S-rst when the IG turns on, the CPU-wl 101 is reliably reset even if the power-on reset circuit 105 does not work properly.

However, if the IG turns on while the CPU-wl 101 is in the process of wireless signal waiting, receiving, or wireless communicating, the CPU-cl 201 does not send out the S-rst and the power-on reset circuit 105 also does not send out the S-rst by the procedure of S-pcl ON→S-prq OFF as described in steps 530 and 531. Thus, the CPU-wl 101 does not stop due to the reset, so that the process of wireless signal waiting, receiving, or wireless communicating is prevented from being interrupted.

The above embodiment may be modified as follows. In the above embodiment, the phone module switch 108 is used for the CPU-wl 101 to control the power supply to the phone module 102. Meanwhile, voltage change generated by rapid switching ON/OFF of the phone module switch 108 can be used as a transmission signal when a digital communication method is substituted for a phone. The substitution consumes less power than the procedure where the transmission signal is sent through the phone module 102 from the CPU-wl 101 with the phone module switch 108 being constantly ON.

In addition, the IG ON/OFF may be inputted to the CPU-cl 201 not through the dedicated line different from the in-vehicle LAN as shown in FIG. 1, but through the in-vehicle LAN.

In addition, the period from the counter reset of the RTC 104 to the expiration may be changed from 15 minutes to any other minutes.

In addition, though the above telematics station is divided into the wireless section 1 and the control section 2, it may not be divided.

In addition, though the above telematics station has the CPU-wl 101 and the CPU-cl 201, two CPUs are not mandatory for executing functions and only one CPU may execute all functions.

In addition, though the CPU-cl 201 operates in two kinds of the sleep mode and the active mode, it may constantly operate only in the active mode.

What is claimed is:

1. An emergency report system for a vehicle, the system comprising:
    a wireless section that informs an emergency report center by transmitting data, when an airbag of the vehicle is expanded;
    a reset section that resets a CPU of the wireless section when an ignition switch of the vehicle is turned on from an off state;
    a determination section that determines whether or not the wireless section executes one process of a wireless signal waiting process and a wireless communicating process when the ignition switch is turned on from the off state;
    a reset prohibiting section that prohibits the reset section from resetting the CPU when the wireless section is determined to be executing the one process when the ignition switch of the vehicle is turned on from the off state; and a control section that controls the reset section to thereby reset the CPU of the wireless section, and receives (i) a reset signal for detecting that the ignition switch is turned on from the off state and (ii) an airbag-expansion signal for indicating an expansion of the airbag, the control section being coupled with the wireless section via a connector, and the control section executing, via the connector, the resetting of the CPU of the wireless section by the reset section.

2. An emergency report system for a vehicle, the system comprising:

a wireless section that informs, when an airbag of the vehicle is expanded, to an emergency report center by transmitting airbag expansion information;

a reset section that resets a CPU of the wireless section when an ignition switch of the vehicle is turned on from an off state;

a determination section that determines whether or not the wireless section is executing a wireless communicating process for transmitting the airbag expansion information when the ignition switch is turned on from the off state;

a reset prohibiting section that prohibits the reset section from resetting the CPU when the wireless section is determined to be executing the wireless communicating process for transmitting the airbag expansion information;

a control section that includes the reset section, the determination section, and the reset prohibiting section; and a connector coupling the control section with the wireless section, wherein:

(i) if the determination section determines that the wireless section is not executing the wireless communicating process for transmitting the airbag expansion information when the ignition switch is turned on from the off state, the control section causing the reset section to reset, via the connector, the CPU of the wireless section; and (ii) if the determination section determines that the wireless section is executing the wireless communicating process for transmitting the airbag expansion information when the ignition switch is turned on from the off state, the control section prohibits the reset section from resetting, via the connector, the CPU of the wireless section.

* * * * *